United States Patent
Yokogi et al.

(10) Patent No.: US 8,742,057 B2
(45) Date of Patent: Jun. 3, 2014

(54) POLYCARBONATE RESIN COMPOSITION

(71) Applicant: Mitsubishi Chemical Corporation, Tokyo (JP)

(72) Inventors: Masashi Yokogi, Fukuoka (JP); Haruo Sasaki, Fukuoka (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 13/970,205

(22) Filed: Aug. 19, 2013

(65) Prior Publication Data

US 2013/0331527 A1    Dec. 12, 2013

Related U.S. Application Data

(63) Continuation of application No. PCT/JP2012/053561, filed on Feb. 15, 2012.

(30) Foreign Application Priority Data

Feb. 17, 2011  (JP) ................. 2011-031777
Feb. 17, 2011  (JP) ................. 2011-031789

(51) Int. Cl.
*C08G 64/00*  (2006.01)
*C08G 63/02*  (2006.01)

(52) U.S. Cl.
USPC ................ 528/198; 525/469; 528/196

(58) Field of Classification Search
USPC ....................................... 525/469
See application file for complete search history.

(56) References Cited

U.S. PATENT DOCUMENTS

| 8,481,625 | B2 | 7/2013 | Yokogi et al. |
| 2010/0031890 | A1 | 2/2010 | Vosbikian |
| 2010/0190953 | A1 | 7/2010 | Fuji et al. |
| 2012/0328855 | A1 | 12/2012 | Yokogi et al. |
| 2013/0075480 | A1 | 3/2013 | Yokogi et al. |
| 2013/0116365 | A1 | 5/2013 | Yokogi et al. |
| 2013/0131271 | A1 | 5/2013 | Yokogi et al. |
| 2013/0237649 | A1 | 9/2013 | Yokogi et al. |

FOREIGN PATENT DOCUMENTS

| JP | 4-2614 | 1/1992 |
| JP | 2008-024919 | 2/2008 |
| JP | 2009-500195 | 1/2009 |
| JP | 2009-062501 | 3/2009 |
| JP | 2012-041469 | 3/2012 |
| WO | 83/03906 | 11/1983 |
| WO | 2007/008390 | 1/2007 |
| WO | 2010/016929 | 2/2010 |

OTHER PUBLICATIONS

U.S. Appl. No. 14/041,397, filed Sep. 30, 2013, Yokogi, et al.
U.S. Appl. No. 14/041,482, filed Sep. 30, 2013, Sasaki, et al.
U.S. Appl. No. 14/041,883, filed Sep. 30, 2013, Sasaki, et al.
International Search Report issued on Apr. 17, 2012 in PCT/JP2012/053561 filed on Feb. 15, 2012.
U.S. Appl. No. 13/968,519, filed Aug. 16, 2013, Kaito, et al.

*Primary Examiner* — Terressa Boykin

(74) *Attorney, Agent, or Firm* — Oblon, Spivak, McClelland, Maier & Neustadt, L.L.P.

(57) ABSTRACT

A polycarbonate resin composition (X), comprises: (A) a polycarbonate resin containing (a) a structural unit derived from a dihydroxy compound having a moiety represented by the following formula (1) in a part of a structure; and (B) an aromatic polycarbonate resin, wherein a reduced viscosity of the aromatic polycarbonate resin (B) is 0.55 dl/g or less, a proportion of the aromatic polycarbonate resin (B) in the polycarbonate resin composition (X) is 30 wt % or more, and a total light transmittance of the polycarbonate resin composition (X) is 90% or less:

$$-(CH_2-O)- \qquad (1).$$

8 Claims, No Drawings

POLYCARBONATE RESIN COMPOSITION

TECHNICAL FIELD

The present invention provides a polycarbonate resin composition with excellent pencil hardness.

BACKGROUND ART

A molded body using an aromatic polycarbonate resin having bisphenol A as a main skeleton is excellent in the heat resistance and impact resistance. However, the surface hardness thereof is low and inferior to glass or a polymethyl methacrylate resin (PMMA), and for the purpose of improving surface characteristics of polycarbonate, various surface treatments are being performed.

For example, Patent Document 1 has proposed a method of applying a (meth)acrylic acid ester on a surface of a polycarbonate substrate and curing the coating with an ultraviolet ray to form a protective film, and Patent Document 2 has proposed a copolymerized polycarbonate of a special bisphenol with bisphenol A.

Also, a polycarbonate using, as a raw material, a dihydroxy compound having an ether bond in the molecule, typified by isosorbide, is known to have an excellent feature that the surface hardness is high (Patent Document 3).

BACKGROUND ART DOCUMENT

Patent Document

Patent Document 1: JP-B-4-2614 (the term "JP-B" as used herein means an "examined Japanese patent publication")
Patent Document 2: JP-T-2009-500195 (the term "JP-T" as used herein means a published Japanese translation of a PCT patent application)
Patent Document 3: JP-A-2008-24919 (the term "JP-A" as used herein means an "unexamined published Japanese patent application")

SUMMARY OF INVENTION

Problem that Invention is to Solve

However, in Patent Documents 1 and 2, sufficient surface hardness may not be always obtained, and Patent Document 3 has a problem that due to high hygroscopicity, physical properties are likely to be changed depending on the outside environment.

Accordingly, an object of the present application is to obtain a carbonate resin excellent in the heat resistance and impact resistance and endowed with high surface hardness.

Means for Solving Problem

A number of intensive studies have been made so as to attain the above-described object, as a result, it has been found that when a polycarbonate having a structure represented by the following formula (1) in the molecule and an aromatic polycarbonate are mixed, high surface hardness is realized. The present invention has been accomplished based on this finding.

That is, the present invention relates to the following polycarbonate resin composition.

[1]
A polycarbonate resin composition (X), comprising:
(A) a polycarbonate resin containing (a) a structural unit derived from a dihydroxy compound having a moiety represented by the following formula (1) in a part of a structure; and
(B) an aromatic polycarbonate resin,
wherein a reduced viscosity of the aromatic polycarbonate resin (B) is 0.55 dl/g or less,
a proportion of the aromatic polycarbonate resin (B) in the polycarbonate resin composition (X) is 30 wt % or more, and
a total light transmittance of the polycarbonate resin composition (X) is 90% or less:

[Chem. 1]

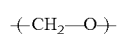
(1)

(provided that a case where the moiety represented by formula (1) is a part of —CH₂—O—H is excluded).

[2]
The polycarbonate resin composition as described in [1] above,
wherein the dihydroxy compound having a moiety represented by formula (1) in a part of a structure is a dihydroxy compound having a plurality of moieties represented by formula (1).

[3]
The polycarbonate resin composition as described in [1] or [2] above,
wherein the dihydroxy compound having a moiety represented by formula (1) in a part of a structure is a dihydroxy compound having a cyclic structure.

[4]
The polycarbonate resin composition as described in any one of [1] to [3] above,
wherein the dihydroxy compound having a moiety represented by formula (1) in a part of a structure is a dihydroxy compound represented by the following formula (2):

[Chem. 2]

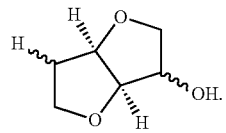
(2)

[5]
The polycarbonate resin composition as described in [4] above,
wherein the polycarbonate resin (A) contains a structural unit derived from the dihydroxy compound represented by formula (2) in an amount of 20 mol % to less than 90 mol %.

[6]
The polycarbonate resin composition as described in any one of [1] to [5] above,
wherein the polycarbonate resin (A) contains at least either one of a structural unit derived from a dihydroxy compound of an aliphatic hydrocarbon and a structural unit derived from a dihydroxy compound of an alicyclic hydrocarbon in an amount of 10 mol % to less than 80 mol %.

[7]

The polycarbonate resin composition as described in any one of [1] to [6] above, wherein the aromatic polycarbonate resin (B) contains a structural unit represented by the following formula (7) in an amount of more than 70 mol % based on all structural units derived from dihydroxy compounds:

$$—[—O—Ar^1—X—Ar^2—]—OC(=O)— \quad (7)$$

(wherein in formula (7), each of $Ar^1$ and $Ar^2$ independently represents an arylene group which may have a substituent; and X represents a single bond or a divalent group).

[8]

A polycarbonate resin molded article, which is obtained by molding the polycarbonate resin composition as described in any one of [1] to [7] above.

Effects of Invention

In the present invention, a resin composition prepared by mixing a polycarbonate having a specific structure and an aromatic polycarbonate is used, so that a resin with high surface hardness can be obtained.

MODE FOR CARRYING OUT INVENTION

The mode for carrying out the present invention is described in detail below, but the constituent requirements described below are an example (representative example) of the embodiment of the present invention, and the present invention is not limited to the following contents as long as its gist is observed.

Incidentally, the expression "(numerical or physical value) to (numerical or physical value)" as used in the description of the present invention is intended to encompass the numerical or physical values before and after "to".

The polycarbonate resin composition of the present invention is a resin composition (X) comprising (A) a polycarbonate resin containing (a) a structural unit derived from a dihydroxy compound having a moiety represented by the following formula (1) in a part of the structure (hereinafter, sometimes referred to as "principal dihydroxy compound") and (B) an aromatic polycarbonate resin and is a resin composition having a specific pencil hardness.

<Polycarbonate Resin (A)>

The polycarbonate resin (A) for use in the present invention is a resin obtained by polycondensation through a transesterification reaction using, as raw materials, a dihydroxy compound containing a dihydroxy compound having a moiety represented by the following formula (1) in a part of the structure and a carbonic acid diester.

That is, the polycarbonate resin (A) for use in the present invention contains (a) a structural unit derived from a dihydroxy compound having a moiety represented by the following formula (1), and the content of the structural unit is preferably from 20 mol % to less than 90 mol %.

[Chem. 3]

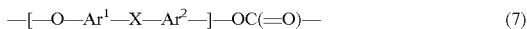

(provided that a case where the moiety represented by formula (1) is a part of —$CH_2$—O—H is excluded).

<Dihydroxy Compound>

The dihydroxy compound for use in the present invention is not particularly limited as long as it has a moiety represented by formula (1) in a part of the structure, but specific examples thereof include oxyalkylene glycols, dihydroxy compounds having, in the main chain, an ether group bonded to an aromatic group, and dihydroxy compounds having a cyclic ether structure.

Examples of the oxyalkylene glycols include diethylene glycol, triethylene glycol, tetraethylene glycol, polyethylene glycol, and polypropylene glycol.

Examples of the dihydroxy compound having an aromatic group in the side chain and having, in the main chain, an ether group bonded to the aromatic group include 9,9-bis(4-(2-hydroxyethoxy)phenyl)fluorene, 9,9-bis(4-(2-hydroxypropoxy)phenyl)fluorene, 9,9-bis(4-(2-hydroxyethoxy)-3-methylphenyl)fluorene, 9,9-bis(4-(2-hydroxypropoxy)-3-methylphenyl)fluorene, 9,9-bis(4-(2-hydroxyethoxy)-3-isopropylphenyl)fluorene, 9,9-bis(4-(2-hydroxyethoxy)-3-isobutylphenyl)fluorene, 9,9-bis(4-(2-hydroxyethoxy)-3-tert-butylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 9,9-bis(4-(2-hydroxyethoxy)-3,5-dimethylphenyl)fluorene, 9,9-bis(4-(2-hydroxyethoxy)-3-tert-butyl-6-methylphenyl)fluorene, 9,9-bis(4-(3-hydroxy-2,2-dimethylpropoxy)phenyl)fluorene, 2,2-bis(4-(2-hydroxyethoxy)phenyl)propane, 2,2-bis(4-(2-hydroxypropoxy)phenyl)propane, 1,3-bis(2-hydroxyethoxy)benzene, 4,4'-bis(2-hydroxyethoxy)biphenyl, and bis(4-(2-hydroxyethoxy)phenyl]sulfone.

Examples of the dihydroxy compound having a cyclic ether structure include a compound having a cyclic ether structure, such as anhydrous sugar alcohol typified by a dihydroxy compound represented by the following formula (2), and spiroglycol represented by the following formula (3) or (4). Among these, a dihydroxy compound having a plurality of cyclic ether structures, such as dihydroxy compound represented by the following formula (2) and spiroglycol represented by the following formula (3), are preferred; a dihydroxy compound having two cyclic ether structures and having a symmetric structure is more preferred; and a dihydroxy compound represented by the following formula (2) is still more preferred.

The structure of the dihydroxy compound having a plurality of cyclic ether structures is rigid and therefore, the polymer obtained tends to be a rigid polymer with high surface hardness and high heat resistance.

[Chem. 4]

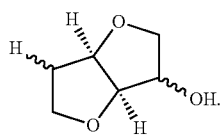

(2)

[Chem. 5]

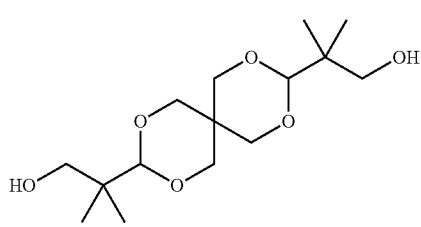

(3)

[Chem. 6]

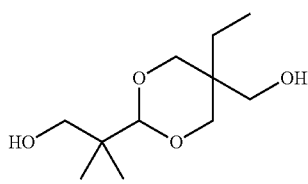

(4)

Among these, in view of availability, handling, reactivity during polymerization, and heat resistance of the polycarbonate resin (A) obtained, a dihydroxy compound having a cyclic ether structure is preferred; and an anhydrous sugar alcohol typified by the dihydroxy compound represented by formula (2), and a compound having a cyclic ether structure represented by formula (3) or (4) are more preferred. One of these compounds may be used alone, or two or more thereof may be used in combination, according to the performance required of the obtained polycarbonate resin (A).

The dihydroxy compound represented by formula (2) includes isosorbide, isomannide, and isoidide, which are in a stereoisomeric relationship. One of these compounds may be used alone, or two or more thereof may be used in combination.

Among these principal dihydroxy compounds, it is preferred in view of light resistance of the polycarbonate resin (A) to use a dihydroxy compound having no aromatic ring structure, and above all, isosorbide obtained by dehydration condensation of sorbitol produced from various starches existing abundantly as a plant-derived resource and being easily available is most preferred from the aspects of ease of availability and production, light resistance, optical characteristics, moldability, heat resistance and carbon neutrality.

The polycarbonate resin (A) for use in the present invention may contain a structural unit derived from a dihydroxy compound (hereinafter, sometimes referred to as "other dihydroxy compounds") other than the above-described principal dihydroxy compound.

The structure derived from the dihydroxy compound having a moiety represented by formula (1), particularly, the structure containing a cyclic ether, is high in the polarity and therefore, the polarity of the polycarbonate resin (A) is high as the whole polymer, whereas the polarity of the later-described aromatic polycarbonate resin (B) is relatively low. Therefore, the resin composition obtained by mixing the polycarbonate resin (A) and the aromatic polycarbonate resin (B) may become opaque due to failure in complete compatibilization between the resins. When these are completely compatibilized, respective characteristics of two resins are substantially counterbalanced, and uniform physical properties are obtained in many cases. However, when the resins are not completely compatibilized, high surface hardness characteristic of the polycarbonate resin (A) is likely to be maintained, and the surface hardness of the resin composition as well as the molded body thereof is kept high as compared with the case where they are completely compatibilized. For these reasons, the content of the structural unit (a) derived from the dihydroxy compound having a moiety represented by formula (1) is preferably 20 mol % or more, more preferably 25 mol % or more, still more preferably 30 mol % or more.

On the other hand, if the content of the structural unit (a) is too large, compatibility with the polycarbonate resin (B) is utterly worsened, and unevenness may be generated in the obtained molded body to impair the appearance. For these reasons, the content is preferably 90 mol % or less, more preferably 85 mol % or less, still more preferably 80 mol % or less.

The polycarbonate resin (A) preferably contains a structural unit derived from other dihydroxy compounds, in addition to the structural unit (a) derived from the dihydroxy compound having a moiety represented by formula (1), based on all structural units derived from dihydroxy compounds.

The content of the structural unit derived from other dihydroxy compounds is, based on all structural units derived from dihydroxy compounds, preferably 10 mol % or more, more preferably 15 mol % or more, still more preferably 20 mol % or more, and the upper limit of the content is preferably 80 mol % or less, more preferably 65 mol % or less, still more preferably 50 mol % or less.

Examples of other dihydroxy compounds include a dihydroxy compound of an aliphatic hydrocarbon such as a dihydroxy compound of a linear aliphatic hydrocarbon and a dihydroxy compound of a linearly branched aliphatic hydrocarbon, a dihydroxy compound of an alicyclic hydrocarbon, and aromatic bisphenols.

Examples of the dihydroxy compound of a linear aliphatic hydrocarbon include ethylene glycol, 1,3-propanediol, 1,2-propanediol, 1,4-butanediol, 1,3-butanediol, 1,2-butanediol, 1,5-heptanediol, and 1,6-hexanediol.

Examples of the dihydroxy compound of a linearly branched aliphatic hydrocarbon include neopentyl glycol and hexylene glycol.

Examples of the dihydroxy compound of an alicyclic hydrocarbon include 1,2-cyclohexanedimethanol, 1,3-cyclohexanedimethanol, 1,4-cyclohexanedimethanol, tricyclodecanedimethanol, pentacyclopentadecanedimethanol, 2,6-decalindimethanol, 1,5-decalindimethanol, 2,3-decalindimethanol, 2,3-norbornanedimethanol, 2,5-norbornanedimethanol, and 1,3-adamantanedimethanol.

Examples of the aromatic bisphenols include 2,2-bis(4-hydroxyphenyl)propane [=bisphenol A], 2,2-bis(4-hydroxy-3,5-dimethylphenyl)propane, 2,2-bis(4-hydroxy-3,5-diethylphenyl)propane, 2,2-bis(4-hydroxy-(3,5-diphenyl)phenyl)propane, 2,2-bis(4-hydroxy-3,5-dibromophenyl)propane, 2,2-bis(4-hydroxyphenyl)pentane, 2,4'-dihydroxy-diphenylmethane, bis(4-hydroxyphenyl)methane, bis(4-hydroxy-5-nitrophenyl)methane, 1,1-bis(4-hydroxyphenyl)ethane, 3,3-bis(4-hydroxyphenyl)pentane, 1,1-bis(4-hydroxyphenyl)cyclohexane, bis(4-hydroxyphenyl)sulfone, 2,4'-dihydroxydiphenylsulfone, bis(4-hydroxyphenyl)sulfide, 4,4'-dihydroxydiphenyl ether, 4,4'-dihydroxy-3,3'-dichlorodiphenyl ether, 9,9-bis(4-(2-hydroxyethoxy-2-methyl)phenyl)fluorene, 9,9-bis(4-hydroxyphenyl)fluorene, and 9,9-bis(4-hydroxy-2-methylphenyl)fluorene.

One of these may be used alone, or two or more thereof may be used in combination, according to the performance required of the polycarbonate obtained.

Above all, in view of availability and ease of handling, the dihydroxy compound of an aliphatic hydrocarbon is preferably 1,3-propanediol, 1,4-butanediol or 1,6-hexane diol. The dihydroxy compound of an alicyclic hydrocarbon is a compound having a hydrocarbon skeleton of cyclic structure and having two hydroxy groups, and the hydroxy group may be bonded directly to the cyclic structure or may be bonded to the cyclic structure through a substituent. The cyclic structure may be monocyclic or polycyclic. The dihydroxy compound of an alicyclic hydrocarbon is preferably 1,4-cyclohexanedimethanol or tricyclodecanedimethanol.

The dihydroxy compound for use in the present invention may contain a stabilizer such as reducing agent, antioxidant, deoxidizer, light stabilizer, antacid, pH stabilizer and heat stabilizer. In particular, the dihydroxy compound for use in the present invention is susceptible to a change in quality under acidic conditions and therefore, it is preferred to contain a basic stabilizer.

Examples of the basic stabilizer include hydroxides, carbonates, phosphates, phosphites, hypophosphites, borates and fatty acid salts of metals belonging to Group 1 or Group 2 of the long-form periodic table (Nomenclature of Inorganic Chemistry IUPAC Recommendations 2005); a basic ammonium compound such as tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide and butyltriphenylammonium hydroxide; and an amine-based compound such as 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole and aminoquinoline. Among these, in view of the effects and ease of the later-described removal by distillation, a phosphate and a phosphite of sodium or potassium are preferred, and disodium hydrogenphosphate and disodium hydrogenphosphite are more preferred.

The content of the basic stabilizer in the dihydroxy compound for use in the present invention is not particularly limited, but if the content is too small, the effect of preventing a change in quality of the dihydroxy compound for use in the present invention may not be obtained, whereas if the content is too large, denaturation of the dihydroxy compound may be caused. For these reasons, the content is usually from 0.0001 to 1 wt %, preferably from 0.001 to 0.1 wt %, based on the dihydroxy compound for use in the present invention.

In the case where the dihydroxy compound for use in the present invention is a compound having a cyclic ether structure, such as isosorbide, the compound is liable to be gradually oxidized by oxygen and therefore, it is important to prevent oxygen-induced decomposition by keeping away from inclusion of water during storage or production, use an oxygen scavenger or the like, or treat the dihydroxy compound in a nitrogen atmosphere. Oxidation of isosorbide is sometimes associated with generation of a decomposition product such as formic acid. For example, when isosorbide containing such a decomposition product is used as a raw material for the production of a polycarbonate resin, this disadvantageously leaves the possibility that coloration of the obtained polycarbonate resin obtained is caused or not only the physical properties are significantly deteriorated but also due to effect on the polymerization reaction, a polymer having a high molecular weight is not obtained.

<Carbonic Acid Diester>

The polycarbonate resin (A) for use in the present invention can be obtained by polycondensation through a transesterification reaction using, as raw materials, a dihydroxy compound containing the above-described dihydroxy compound for use in the present invention and a carbonic acid diester.

The carbonic acid diester used includes usually a carbonic acid diester represented by the following formula (5). One of these carbonic acid diesters may be used alone, or two or more thereof may be mixed and used.

[Chem.7]

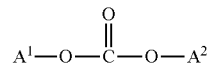

(wherein each of $A^1$ and $A^2$ is independently a substituted or unsubstituted aliphatic group having a carbon number of 1 to 18 or a substituted or unsubstituted aromatic group).

Examples of the carbonic acid diester represented by formula (5) include diphenyl carbonate, a substituted diphenyl carbonate such as ditolyl carbonate, dimethyl carbonate, diethyl carbonate, and di-tert-butyl carbonate. Among these, diphenyl carbonate and a substituted diphenyl carbonate are preferred, and diphenyl carbonate is more preferred. Incidentally, the carbonic acid diester sometimes contains impurities such as chloride ion and since the impurities may inhibit the polymerization reaction or worsen the color hue of the polycarbonate resin obtained, a carbonic acid diester purified by distillation or the like is preferably used, if desired.

<Transesterification Reaction Catalyst>

The polycarbonate resin (A) for use in the present invention is produced, as described above, by subjecting a dihydroxy compound containing the dihydroxy compound for use in the present invention and a carbonic acid diester represented by formula (5) to a transesterification reaction. In more detail, the polycarbonate resin is obtained by removing, for example, a byproduct monohydroxy compound generated during transesterification out of the system. In this case, polycondensation is usually performed by a transesterification reaction in the presence of a transesterification reaction catalyst.

The transesterification reaction catalyst (hereinafter, sometimes simply referred to as catalyst or polymerization catalyst) which can be used at the production of the polycarbonate resin (A) for use in the present invention affects in particular the light transmittance at a wavelength of 350 nm or the yellow index value.

The catalyst used is not limited as long as it can satisfy particularly the light resistance out of light resistance, transparency, color hue, heat resistance, thermal stability and mechanical strength of the polycarbonate resin (A) produced, but examples thereof include a compound of a metal belonging to Group 1 or 2 of the long-form periodic table (hereinafter, simply referred to as "Group 1" or "Group 2"), and a basic compound such as basic boron compound, basic phosphorus compound, basic ammonium compound and amine-based compound. A Group 1 metal compound and/or a Group 2 metal compound are preferably used.

A basic compound such as basic boron compound, basic phosphorus compound, basic ammonium compound and amine-based compound may be secondarily used in combination with a Group 1 metal compound and/or a Group 2 metal compound, but it is particularly preferred to use only a Group 1 metal compound and/or a Group 2 metal compound.

As for the form of the Group 1 metal compound and/or Group 2 metal compound, the compound is used usually in the form of a hydroxide or a salt such as carbonate, carboxylate and phenoxide, but in view of availability and ease of handling, a hydroxide, a carbonate or an acetate is preferred, and in view of color hue and polymerization activity, an acetate is preferred.

Examples of the Group 1 metal compound include sodium hydroxide, potassium hydroxide, lithium hydroxide, cesium hydroxide, sodium hydrogencarbonate, potassium hydrogencarbonate, lithium hydrogencarbonate, cesium hydrogencarbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium borohydride, potassium borohydride, lithium borohydride, cesium borohydride, sodium borophenylate, potassium borophenylate, lithium borophenylate, cesium borophenylate, sodium benzoate, potassium benzoate, lithium benzoate, cesium benzoate, disodium hydrogenphosphate, dipotassium hydrogenphosphate, dilithium hydrogenphosphate, dicesium hydrogenphosphate, disodium phenylphosphate, dipotassium phenylphosphate, dilithium phenylphosphate, dicesium phenylphosphate, an alcoholate or phenolate of sodium, potassium, lithium and cesium, and disodium, dipotassium, dilithium and dicesium salts of bisphenol A. Among these, a lithium compound is preferred.

Examples of the Group 2 metal compound include calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate. Among these, a magnesium compound, a calcium compound and a barium compound are preferred, and in view of polymerization activity and color hue of the polycarbonate resin obtained, a magnesium compound and/or a calcium compound are more preferred, with a calcium compound being most preferred.

Examples of the basic boron compound include sodium, potassium, lithium, calcium, barium, magnesium and strontium salts of tetramethylboron, tetraethylboron, tetrapropylboron, tetrabutylboron, trimethylethylboron, trimethylbenzylboron, trimethylphenylboron, triethylmethylboron, triethylbenzylboron, triethylphenylboron, tributylbenzylboron, tributylphenylboron, tetraphenylboron, benzyltriphenylboron, methyltriphenylboron and butyltriphenylboron.

Examples of the basic phosphorus compound include triethylphosphine, tri-n-propylphosphine, triisopropylphosphine, tri-n-butylphosphine, triphenylphosphine, tributylphosphine, and a quaternary phosphonium salt.

Examples of the basic ammonium compound include tetramethylammonium hydroxide, tetraethylammonium hydroxide, tetrapropylammonium hydroxide, tetrabutylammonium hydroxide, trimethylethylammonium hydroxide, trimethylbenzylammonium hydroxide, trimethylphenylammonium hydroxide, triethylmethylammonium hydroxide, triethylbenzylammonium hydroxide, triethylphenylammonium hydroxide, tributylbenzylammonium hydroxide, tributylphenylammonium hydroxide, tetraphenylammonium hydroxide, benzyltriphenylammonium hydroxide, methyltriphenylammonium hydroxide, and butyltriphenylammonium hydroxide.

Examples of the amine-based compound include 4-aminopyridine, 2-aminopyridine, N,N-dimethyl-4-aminopyridine, 4-diethylaminopyridine, 2-hydroxypyridine, 2-methoxypyridine, 4-methoxypyridine, 2-dimethylaminoimidazole, 2-methoxyimidazole, imidazole, 2-mercaptoimidazole, 2-methylimidazole, and aminoquinoline.

The amount of the polymerization catalyst used is preferably from 0.1 to 300 µmol, more preferably from 0.5 to 100 µmol, per mole of all dihydroxy compounds used for the polymerization. Above all, in the case of using a compound containing at least one metal selected from the group consisting of lithium and a Group 2 metal of the long-form periodic table, particularly, in the case of using a magnesium compound and/or a calcium compound, the amount of the catalyst used is, in terms of the metal amount, preferably 0.1 µmol or more, more preferably 0.5 µmol or more, still more preferably 0.7 µmol or more, per mol of all dihydroxy compounds, and the upper limit is preferably 20 µmol, more preferably 10 µmol, still more preferably 3 µmol, yet still more preferably 1.5 µmol, and most preferably 1.0 µmol.

If the amount of the catalyst is too small, the polymerization rate becomes low and when it is intended to obtain a polycarbonate resin (A) having a desired molecular weight, the polymerization temperature must be raised, as a result, the color hue or light resistance of the polycarbonate resin (A) obtained may be worsened, or an unreacted raw material may volatilize during the polymerization to disrupt the molar ratio between a dihydroxy compound containing the dihydroxy compound for use in the present invention and a carbonic acid diester represented by formula (5), leaving the possibility that the desired molecular weight is not achieved. On the other hand, if the amount of the polymerization catalyst used is too large, the color hue of the polycarbonate resin (A) may be worsened to deteriorate the light resistance of the polycarbonate resin (A).

Furthermore, in the case of producing the polycarbonate resin (A) for use in the present invention by using, as the carbonic acid diester represented by formula (5), diphenyl carbonate or a substituted diphenyl carbonate such as ditolyl carbonate, phenol or a substituted phenol is generated as a byproduct and unavoidably remains in the polycarbonate resin (A), but both phenol and a substituted phenol absorb an ultraviolet ray because of having an aromatic ring and this may not only give rise to reduction in the light resistance but also an odor during molding. After a normal batch reaction, the polycarbonate resin (A) contains 1,000 ppm by weight or more of an aromatic ring-containing aromatic monohydroxy compound such as byproduct phenol, but in view of light resistance or odor reduction, the content of such an aromatic monohydroxy compound is preferably reduced to 700 ppm by weight or less, more preferably to 500 ppm by weight or less, still more preferably to 300 ppm by weight or less, by using a horizontal reactor excellent in devolatization performance or an extruder with a vacuum vent. However, it is difficult in industry to completely remove the aromatic monohydroxy compound, and the lower limit of the content thereof is usually 1 ppm by weight.

Incidentally, such an aromatic monohydroxy compound may of course have a substituent depending on the raw material used and, for example, may have an alkyl group having a carbon number of 5 or less.

Also, if a Group 1 metal, among others, sodium, potassium or cesium, particularly, lithium, sodium, potassium or cesium, is contained in the polycarbonate resin (A) in a large amount, such a metal may adversely affect the color hue. The metal may migrate not only from the catalyst used but also from the raw material or the reaction apparatus. For this reason, the total amount of these compounds in the polycarbonate resin (A) is usually, in terms of the metal amount, 1 ppm by weight or less, preferably 0.8 ppm by weight or less, more preferably 0.7 ppm by weight or less.

The metal amount in the polycarbonate resin (A) can be measured by atomic emission, atomic absorption, Inductively Coupled Plasma (ICP) or other methods after recovering the metal in the polycarbonate resin by a wet ashing method or the like.

<Production Method for Polycarbonate Resin (A)>

The polycarbonate resin (A) for use in the present invention is obtained by subjecting a dihydroxy compound containing the dihydroxy compound for use in the present invention and a carbonic acid diester of formula (5) to polycondensation by a transesterification reaction therebetween, and these raw materials, that is, a dihydroxy compound and a carbonic acid diester, are preferably mixed uniformly before the transesterification reaction.

The temperature at mixing is usually 80° C. or more, preferably 90° C. or more, and the upper limit thereof is usually 250° C. or less, preferably 200° C. or less, more preferably 150° C. or less. Above all, a temperature of 100 to 120° C. is suitable. If the temperature at mixing is too low, the dissolution rate may be low or the solubility may be insufficient, often causing a trouble such as solidification. If the temperature at mixing is too high, thermal deterioration of the dihydroxy compound may be caused, as a result, the color hue of the obtained polycarbonate resin may be worsened to adversely affect the light resistance.

From the standpoint of preventing worsening of the color hue, the operation of mixing a dihydroxy compound containing the dihydroxy compound for use in the present invention and a carbonic acid diester represented by formula (5), which are raw materials of the polycarbonate resin (A) for use in the present invention, is preferably performed in an atmosphere having an oxygen concentration of 10 vol % or less, more preferably from 0.0001 to 10 vol %, still more preferably from 0.0001 to 5 vol %, yet still more preferably from 0.0001 to 1 vol %.

In order to obtain the polycarbonate resin (A) for use in the present invention, the carbonic acid diester represented by formula (5) is preferably used in a molar ratio of 0.90 to 1.20, more preferably from 0.95 to 1.10, based on dihydroxy compounds used for the reaction containing the dihydroxy compound for use in the present invention.

If this molar ratio becomes small, the terminal hydroxyl group of the produced polycarbonate resin may be increased to worsen the thermal stability of the polymer and in turn, cause coloration during molding, the transesterification reaction rate may be reduced, or a desired high-molecular polymer may not be obtained.

Also, if this molar ratio becomes large, the transesterification reaction rate may be reduced or a polycarbonate resin (A) having a desired molecular weight may be difficult to produce. Reduction in the transesterification reaction rate may lead to an increase in the heat history during polymerization reaction, as a result, the color hue or light resistance of the obtained polycarbonate resin may be impaired.

Furthermore, if the molar ratio of the carbonic acid diester represented by formula (5) based on a dihydroxy compound containing the dihydroxy compound for use in the present invention is increased, the amount of the carbonic acid diester remaining in the obtained polycarbonate resin (A) is increased, and this residual carbonic acid diester may disadvantageously absorb an ultraviolet ray and worsen the light resistance of the polycarbonate resin.

The concentration of the carbonic acid diester remaining in the polycarbonate resin (A) for use in the present invention is preferably 200 ppm by weight or less, more preferably 100 ppm by weight or less, still more preferably 60 ppm by weight or less, yet still more preferably 30 ppm by weight or less. The polycarbonate resin (A) may actually contain an unreacted carbonic acid diester, and the lower limit of the concentration is usually 1 ppm by weight.

In the present invention, the method for performing polycondensation of a dihydroxy compound and a carbonic acid diester is performed in the presence of the above-described catalyst in multiple stages by using a plurality of reactors. The mode of reaction may be any of a batch method, a continuous method, and a combination of a batch method and a continuous method. It is preferred that in the initial stage of polymerization, the polymerization is performed at a relatively low temperature under relatively low vacuum to obtain a prepolymer and in the later stage of polymerization, the polymerization is performed at a relatively high temperature under relatively high vacuum to raise the molecular weight to a predetermined value. However, in view of color hue and light resistance, important is to appropriately select the jacket temperature, the internal temperature and the pressure in the system for each molecular weight stage. For example, when either one of temperature and pressure is too early changed before the polymerization reaction reaches a predetermined value, an unreacted monomer is distilled off to disrupt the molar ratio between the dihydroxy compound and the carbonic acid diester, causing reduction in the polymerization rate, or a polymer having a predetermined molecular weight or a predetermined terminal group may not be obtained, as a result, the object of the present invention may not be achieved.

Furthermore, use of a reflux condenser in the polymerization reactor is effective in reducing the amount of a monomer distilled off, and the effect of the reflux condenser is high particularly in a reactor for the initial stage of polymerization, where the amount of an unreacted monomer is large. The temperature of a cooling medium introduced into the reflux condenser may be appropriately selected according to the monomer used, but the temperature of the cooling medium being introduced into the reflux condenser is, at the inlet of the reflux condenser, usually from 45 to 180° C., preferably from 80 to 150° C., more preferably from 100 to 130° C. If the temperature of the cooling medium introduced into the reflux condenser is too high, the effect thereof is reduced, whereas if the temperature is too low, the distillation efficiency for the monohydroxy compound that should be originally removed by distillation tends to decrease. Examples of the cooling medium used include warm water, steam, and heating medium oil, with steam and heating medium oil being preferred.

For obtaining a final polycarbonate resin without damaging the color hue, thermal stability, light resistance and the like while appropriately maintaining the polymerization rate and suppressing the distillation of a monomer, it is important to select the kind and amount of the above-described catalyst.

The polycarbonate resin (A) for use in the present invention is preferably produced by multistage polymerization using a catalyst and a plurality of reactors. The reason to perform the polymerization by using a plurality of reactors is that: in the initial stage of polymerization reaction, the amount of a monomer contained in the reaction solution is large and therefore, it is important to suppress volatilization of the monomer while maintaining a necessary polymerization rate; and in the later stage of polymerization reaction, it is important to sufficiently remove a by-product monohydroxy compound by distillation so as to shift the equilibrium to the polymerization side. For such setting of different polymerization reaction conditions, use of a plurality of polymerization reactors arranged in series is preferred in view of production efficiency.

As described above, the number of reactors used in the method of the present invention may be sufficient if it is at least 2 or more, but in view of production efficiency and the like, the number of reactors is 3 or more, preferably from 3 to 5, more preferably 4.

In the present invention, when two or more reactors are used, the reactors may be designed to, for example, further have a plurality of reaction stages differing in the conditions or be continuously changed in the temperature/pressure.

In the present invention, the polymerization catalyst may be added to a raw material preparation tank or a raw material storage tank or may be added directly to a polymerization tank, but in view of feed stability and polymerization control, the catalyst is preferably fed in the form of an aqueous solution by providing a catalyst feed line in the middle of a raw material line before feeding to a polymerization tank.

If the polymerization reaction temperature is too low, this may lead to a decrease in the productivity or an increase of the heat history added to the product, whereas if the temperature is too high, not only volatilization of a monomer may be caused but also decomposition or coloration of the polycarbonate resin may be promoted.

Specifically, the reaction in the first stage is performed at a temperature of in terms of maximum internal temperature of the polymerization reactor, from 140 to 270° C., preferably from 180 to 240° C., more preferably from 200 to 230° C., under a pressure of 110 to 1 kPa, preferably from 70 to 5 kPa, more preferably from 30 to 10 kPa (absolute pressure), for a reaction time of 0.1 to 10 hours, preferably from 0.5 to 3 hours, while removing the generated monohydroxy compound by distillation out of the reaction system.

The reaction in the second and subsequent stages is performed by gradually lowering the pressure of the reaction system from the pressure in the first stage and finally setting the pressure (absolute pressure) of the reaction system to 200 Pa or less, at a maximum internal temperature of 210 to 270° C., preferably from 220 to 250° C., for usually from 0.1 to 10 hours, preferably from 1 to 6 hours, more preferably from 0.5 to 3 hours, while removing the continuously generated monohydroxy compound out of the reaction system.

Above all, in order to obtain a polycarbonate resin (A) excellent in the color hue and light resistance by suppressing coloration or thermal deterioration of the polycarbonate resin (A), the maximum internal temperature in all reaction stages is preferably less than 250° C., more preferably from 225 to 245° C. Also, for inhibiting a drop of the polymerization rate in the latter half of the polymerization reaction and minimizing deterioration due to heat history, a horizontal reactor excellent in the plug-flow properties and interface renewal properties is preferably used in the final stage of polymerization.

If a high polymerization temperature and a too long polymerization time are employed so as to obtain a polycarbonate resin (A) having a predetermined molecular weight, this tends to cause a decrease in the ultraviolet transmittance and an increase in the yellow index (YI) value.

In view of effective utilization of resources, the by-product monohydroxy compound is preferably purified, if desired, and then reused as a raw material of diphenyl carbonate, bisphenol A or the like.

The polycarbonate resin (A) for use in the present invention is, after polycondensation as described above, usually cooled/solidified and then pelletized by a rotary cutter or the like.

The method for pelletization is not limited, but examples thereof include: a method where the resin is withdrawn in a molten state from the final polymerization reactor, cooled/solidified in the form of a strand and then pelletized; a method where the resin is fed in a molten state from the final polymerization reactor to a single- or twin-screw extruder, melt-extruded, cooled/solidified and then pelletized; and a method where the resin is withdrawn in a molten state from the final polymerization reactor, cooled/solidified in the form of a strand and once pelletized and thereafter, the resin is again fed to a single- or twin-screw extruder, melt-extruded, cooled/solidified and then pelletized.

At this time, in the extruder, a residual monomer may be devolatilized under reduced pressure, or a heat stabilizer, a neutralizer, an ultraviolet absorber, a release agent, a coloring agent, an antistatic agent, a slip agent, a lubricant, a plasticizer, a compatibilizer, a flame retardant and the like, which are usually known, may be added and kneaded. The melt kneading temperature in the extruder depends on the glass transition temperature or molecular weight of the polycarbonate resin (A) but is usually from 150 to 300° C., preferably from 200 to 270° C., more preferably from 230 to 260° C. If the melt kneading temperature is less than 150° C., the melt viscosity of the polycarbonate resin (A) becomes high, as a result, the load on the extruder is increased and the productivity is decreased. If the melt kneading temperature exceeds 300° C., a significant thermal deterioration of polycarbonate is caused, leading to reduction in the mechanical strength or coloration due to decrease of the molecular weight, or gas evolution.

At the production of the polycarbonate resin (A) for use in the present invention, a filter is preferably provided so as to prevent inclusion of an extraneous matter. The position at which the filter is provided is preferably on the downstream side of the extruder, and the rejection size (opening size) of the filter for an extraneous matter is preferably 100 µm or less in terms of filtration accuracy for 99% rejection. Particularly, in the case of avoiding inclusion of a fine extraneous matter in the film application or the like, the size is preferably 40 µm or less, more preferably 10 µm or less.

In order to prevent inclusion of an extraneous matter after extrusion, the extrusion of the polycarbonate resin (A) for use in the present invention is preferably performed in a clean room having a cleanliness defined in JIS B 9920 (2002) of preferably higher than class 7, more preferably higher than class 6. Also, at the time of cooling and chip-forming the extruded polycarbonate resin, a cooling method such as air cooling and water cooling is preferably used. As for the air used in air cooling, an air in which an airborne extraneous matter is previously removed through a hepafilter or the like is preferably used so as to prevent reattachment of an airborne extraneous matter. In the case of employing water cooling, water in which a metallic matter is removed by using an ion-exchange resin or the like and an extraneous matter in water is removed through a filter, is preferably used. The opening size of the filter used is preferably from 10 to 0.45 µm in terms of filtration accuracy for 99% rejection.

The molecular weight of the thus-obtained polycarbonate resin (A) for use in the present invention can be expressed by a reduced viscosity. The reduced viscosity is usually 0.30 dL/g or more, preferably 0.35 dL/g or more, and the upper limit of the reduced viscosity is 1.20 dL/g or less, preferably 1.00 dL/g or less, more preferably 0.80 dL/g or less.

If the reduced viscosity of the polycarbonate resin (A) is too low, the mechanical strength of the molded article may be low, whereas if the reduced viscosity is too high, there is a tendency that flowability at the molding is reduced and the productivity and moldability are impaired.

Incidentally, the reduced viscosity is determined by preparing a solution having a polycarbonate concentration precisely adjusted to 0.6 g/dL with use of methylene chloride as a solvent and measuring the viscosity by means of an Ubbelohde viscosity tube at a temperature of 20.0° C.±0.1° C.

Furthermore, the lower limit of the concentration of the terminal group represented by the following formula (6) in the polycarbonate resin (A) for use in the present invention is usually 20 μeq/g, preferably 40 μeq/g, more preferably 50 μeq/g, and the upper limit is usually 160 μeq/g, preferably 140 μeq/g, more preferably 100 μeq/g.

If the concentration of the terminal group represented by formula (6) is too high, even when the color hue immediately after polymerization or during molding is good, the color hue may be worsened after exposure to an ultraviolet ray, whereas if the concentration is too low, thermal stability may be reduced. The method for controlling the concentration of the terminal group represented by formula (6) includes, for example, a method of controlling the molar ratio between raw materials, that is, a dihydroxy compound containing the dihydroxy compound for use in the present invention and a carbonic acid diester represented by formula (5), and a method of controlling the kind or amount of a catalyst, the polymerization pressure, or the polymerization temperature, at the transesterification reaction.

[Chem. 8]

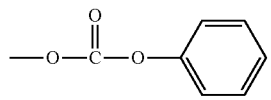

(6)

Also, assuming that the molar number of H bonded to the aromatic ring in the polycarbonate resin (A) for use in the present invention is (C) and the molar number of H bonded to a site other than the aromatic ring is (D), the ratio of the molar number of H bonded to the aromatic ring to the molar number of all H is expressed by C/(C+D), and since the aromatic ring having an ultraviolet absorbing ability may affect the light resistance as described above, the ratio C/(C+D) is preferably 0.1 or less, more preferably 0.05 or less, still more preferably 0.02 or less, yet still more preferably 0.01 or less. The C/(C+D) can be quantitatively determined by $^1$H-NMR.

The polycarbonate resin composition (A) of the present invention can be formed into a molded matter by a commonly known method such as injection molding method, extrusion molding method and compression molding method. Also, before performing various moldings, the polycarbonate resin (A) for use in the present invention can be mixed with an additive such as heat stabilizer, neutralizer, ultraviolet absorber, release agent, coloring agent, antistatic agent, slip agent, lubricant, plasticizer, compatibilizer and flame retardant, by means of a tumbler, a super-mixer, a floater, a V-blender, a Nauta mixer, a Banbury mixer, an extruder or the like.

The glass transition temperature of the polycarbonate resin (A) is preferably from 75 to 160° C., more preferably from 80 to 150° C., still more preferably from 85 to 145° C., yet still more preferably from 90 to 140° C. By using a polycarbonate resin (A) whose glass transition temperature is in the range above, a molded article having excellent heat resistance can be provided.

<Aromatic Polycarbonate Resin (B)>

The aromatic polycarbonate resin (B) for use in the present invention is a polycarbonate resin where a structural unit derived from a dihydroxy compound is connected through a carbonate bond, and any conventionally known resin may be used as long as it has an aromatic ring in the structure. The aromatic polycarbonate resin may be also a resin containing a structural unit derived from a dihydroxy compound having a moiety represented by formula (1). However, in the case of a resin containing a structural unit derived from a dihydroxy compound having a moiety represented by formula (1), a polycarbonate resin different in the structure from the polycarbonate resin (A) is used.

The aromatic polycarbonate resin (B) for use in the present invention may be either a homopolymer or a copolymer. Also, the aromatic polycarbonate resin (B) may have a branched structure.

More specifically, the aromatic polycarbonate resin includes a polycarbonate resin having a repeating unit represented by the following formula (7):

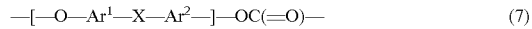 (7)

(wherein in formula (7), each of $Ar^1$ and $Ar^2$ independently represents an arylene group which may have a substituent, and X represents a single bond or a divalent group).

The arylene group which may have a substituent is not particularly limited as long as it is an arylene group, but the arylene group is preferably an arylene group having three or less aromatic rings, more preferably a phenylene group.

The substituent which may be substituted independently on each of $Ar^1$ and $Ar^2$ includes an alkyl group having a carbon number of 1 to 10, which may have a substituent, an alkoxy group having a carbon number of 1 to 10, which may have a substituent, a halogen group, an alkyl halide group having a carbon number of 1 to 10, and an aromatic group having a carbon number of 6 to 20, which may have a substituent. Among these substituents, an alkyl group having a carbon number of 1 to 10, which may have a substituent, and an aromatic group having a carbon number of 6 to 20, which may have a substituent, are preferred, an alkyl group having a carbon number of 1 to 10 is more preferred, and a methyl group is still more preferred.

The divalent group represented by X includes an alkylene group having a chain structure with a carbon number of 1 to 6, which may have a substituted, an alkylidene group having a chain structure with a carbon number of 1 to 6, which may have a substituent, an alkylene group having a cyclic structure with a carbon number of 3 to 6, which may have a substituent, an alkylidene group having a cyclic structure with a carbon number of 3 to 6, which may have a substituent, —O—, —S—, —CO—, and —SO$_2$—. Among these, an alkylidene group having a chain structure with a carbon number of 3 is preferred. The substituent substituted on the alkylene group having a chain structure with a carbon number of 1 to 6 is preferably an aryl group, more preferably a phenyl group.

The structural unit derived from a dihydroxy compound, constituting the aromatic polycarbonate resin (B) for use in the present invention, is a structural unit formed by removing a hydrogen atom from a hydroxyl group of a dihydroxy compound. Specific examples of the corresponding dihydroxy compound include a biphenyl compound, a bisphenol compound, and a halogenated bisphenol compound.

Examples of the biphenyl compound include 4,4'-biphenol, 2,4'-biphenol, 3,3'-dimethyl-4,4'-dihydroxy-1,1'-biphenyl, 3,3'-dimethyl-2,4'-dihydroxy-1,1'-biphenyl, 3,3'-di-(tert-butyl)-4,4'-dihydroxy-1,1'-biphenyl, 3,3',5,5'-tetramethyl-4,4'-dihydroxy-1,1'-biphenyl, 3,3',5,5'-tetra-(tert-butyl)-4,4'-dihydroxy-1,1'-biphenyl, and 2,2',3,3',5,5'-hexamethyl-4,4'-dihydroxy-1,1'-biphenyl.

Examples of the bisphenol compound include bis-(4-hydroxy-3,5-dimethylphenyl)methane, bis-(4-hydroxyphenyl)methane, bis-(4-hydroxy-3-methylphenyl)methane, 1,1-bis(4-hydroxyphenyl)ethane, 1,1-bis-(4-hydroxyphenyl)propane, 2,2-bis-(4-hydroxyphenyl)propane, 2,2-bis-(4-hydroxy-3-methylphenyl)propane, 2,2-bis-(4-hydroxyphenyl)butane, 2,2-bis-(4-hydroxyphenyl)pentane, 2,2-bis-(4-hydroxyphenyl)-3-methylbutane, 2,2-bis-(4-hydroxyphenyl)hexane, 2,2-bis-(4-hydroxyphenyl)-4-methylpentane, 1,1-bis-(4-hydroxyphenyl)cyclopentane, 1,1-bis-(4-hydroxyphenyl)cyclohexane, bis-(3-phenyl-4-hydroxyphenyl)methane, 1,1-bis-(3-phenyl-4-hydroxyphenyl)ethane, 1,1-bis-(3-phenyl-4-hydroxyphenyl)propane, 2,2-bis-(3-phenyl-4-hydroxyphenyl)propane, 1,1-bis-(4-hydroxy-3-methylphenyl)ethane, 2,2-bis-(4-hydroxy-3-ethylphenyl)propane, 2,2-bis-(4-hydroxy-3-isopropylphenyl)propane, 2,2-bis-(4-hydroxy-3-sec-butylphenyl)propane, 1,1-bis-(4-hydroxy-3,5-dimethylphenyl)ethane, 2,2-bis-(4-hydroxy-3,5-dimethylphenyl)propane, 1,1-bis-(4-hydroxy-3,6-dimethylphenyl)ethane, bis-(4-hydroxy-2,3,5-trimethylphenyl)methane, 1,1-bis-(4-hydroxy-2,3,5-trimethylphenyl)ethane, 2,2-bis-(4-hydroxy-2,3,5-trimethylphenyl)propane, bis-(4-hydroxy-2,3,5-trimethylphenyl)phenylmethane, 1,1-bis-(4-hydroxy-2,3,5-trimethylphenyl)phenylethane, 1,1-bis-(4-hydroxy-2,3,5-trimethylphenyl)cyclohexane, bis-(4-hydroxyphenyl)phenylmethane, 1,1-bis-(4-hydroxyphenyl)-1-phenylethane, 1,1-bis-(4-hydroxyphenyl)-1-phenylpropane, bis-(4-hydroxyphenyl)diphenylmethane, bis-(4-hydroxyphenyl)dibenzylmethane, 4,4'-[1,4-phenylenebis(1-methylethylidene)]bis-[phenol], 4,4'-[1,4-phenylenebismethylene]bis-[phenol], 4,4'-[1,4-phenylenebis(1-methylethylidene)]bis-[2,6-dimethylphenol], 4,4'-[1,4-phenylenebismethylene]bis-[2,6-dimethylphenol], 4,4'-[1,4-phenylenebismethylene]bis-[2,3,6-trimethylphenol], 4,4'-[1,4-phenylenebis(1-methylethylidene)]bis-[2,3,6-trimethylphenol], 4,4'-[1,3-phenylenebis(1-methylethylidene)]bis-[2,3,6-trimethylphenol], 4,4'-dihydroxydiphenyl ether, 4,4'-dihydroxydiphenyl sulfone, 4,4'-dihydroxydiphenyl sulfide, 3,3',5,5'-tetramethyl-4,4'-dihydroxydiphenyl ether, 3,3',5,5'-tetramethyl-4,4'-dihydroxydiphenyl sulfone, 3,3',5,5'-tetramethyl-4,4'-dihydroxydiphenyl sulfide, phenolphthalein, 4,4'-[1,4-phenylenebis(1-methylvinylidene)]bisphenol, 4,4'-[1,4-phenylenebis(1-methylvinylidene)]bis[2-methylphenol], (2-hydroxyphenyl)(4-hydroxyphenyl)methane, (2-hydroxy-5-methylphenyl)(4-hydroxy-3-methylphenyl)methane, 1,1-(2-hydroxyphenyl)(4-hydroxyphenyl)ethane, 2,2-(2-hydroxyphenyl)(4-hydroxyphenyl)propane, and 1,1-(2-hydroxyphenyl)(4-hydroxyphenyl)propane.

Examples of the halogenated bisphenol compound include 2,2-bis(3,5-dibromo-4-hydroxyphenyl)propane and 2,2-bis(3,5-dichloro-4-hydroxyphenyl)propane.

Among these dihydroxy compounds, preferred are bisphenol compounds in which phenols are connected through an alkylidene group, such as bis-(4-hydroxy-3,5-dimethylphenyl)methane, bis-(4-hydroxyphenyl)methane, bis-(4-hydroxy-3-methylphenyl)methane, 1,1-bis-(4-hydroxyphenyl)ethane, 2,2-bis-(4-hydroxyphenyl)propane, 2,2-bis-(4-hydroxy-3-methylphenyl)propane, 2,2-bis-(4-hydroxy-3,5-dimethylphenyl)propane, 1,1-bis-(4-hydroxyphenyl)cyclohexane, bis-(4-hydroxyphenyl)phenylmethane, 1,1-bis-(4-hydroxyphenyl)-1-phenylethane, 1,1-bis-(4-hydroxyphenyl)-1-phenylpropane, bis-(4-hydroxyphenyl)diphenylmethane, 2-hydroxyphenyl(4-hydroxyphenyl)methane, and 2,2-(2-hydroxyphenyl)(4-hydroxyphenyl)propane. These are preferred in view of heat resistance and mechanical properties.

Among these compounds, more preferred are bisphenol compounds in which the alkylidene group has a carbon number of 6 or less, such as bis-(4-hydroxyphenyl)methane, bis-(4-hydroxy-3-methylphenyl)methane, bis-(4-hydroxy-3,5-dimethylphenyl)methane, 2,2-bis-(4-hydroxyphenyl)propane, 2,2-bis-(4-hydroxy-3-methylphenyl)propane, 2,2-bis-(4-hydroxy-3,5-dimethylphenyl)propane, and 1,1-bis-(4-hydroxyphenyecyclohexane.

The content of the structural unit derived from a dihydroxy compound having an aromatic ring, for example, the structural unit represented by formula (7), is preferably more than 70 mol %, more preferably 75 mol % or more, still more preferably 80 mol % or more, yet still more preferably 85 mol % or more, based on all structural units derived from dihydroxy compounds used for the aromatic polycarbonate resin (B). If the content is less than 70 mol %, the heat resistance or mechanical properties may be reduced. The content does not have any particular upper limit and may be even 100 mol %.

<Production Method for Aromatic Polycarbonate Resin (B)>

As to the production method for the aromatic polycarbonate resin (B) for use in the present invention, any conventionally known method such as phosgene method, transesterification method and pyridine method may be used. The production method for the aromatic polycarbonate resin (B) by a transesterification method is described below as an example.

The transesterification method is a production method of performing melt transesterification polycondensation by adding a dihydroxy compound and a carbonic diester to a basic catalyst and further adding an acidic substance for neutralizing the basic catalyst. Examples of the dihydroxy compound include biphenyl compounds and bisphenol compounds recited above as examples.

Representative examples of the carbonic diester include a diaryl carbonate such as diphenyl carbonate, ditolyl carbonate, bis(chlorophenyl)carbonate, m-cresyl carbonate, dinaphthyl carbonate and bis(biphenyl)carbonate, and a dialkyl carbonate such as diethyl carbonate, dimethyl carbonate, dibutyl carbonate and dicyclohexyl carbonate. Of these, a diphenyl carbonate is preferably used.

The reduced viscosity of the aromatic polycarbonate resin (B) for use in the present invention is usually from 0.4 to 0.55 dl/g, preferably from 0.45 to 0.53 dl/g, more preferably from 0.47 to 0.52 dl/g.

The aromatic polycarbonate resin (B) generally has a high melt viscosity as compared with the polycarbonate resin (A). If the viscosity difference between resins kneaded is increased, bad dispersibility tends to result upon kneading. If the kneading temperature is raised so as to improve the dispersibility, since the thermal stability of the aliphatic polycarbonate (A) is relatively low in general, decomposition of the polycarbonate resin (A) may proceed during kneading. Also, if the viscosity of the polycarbonate resin (B) becomes high, the flowability is worsened and molding unevenness or distortion is likely to be generated upon molding. If the viscosity is low, it is highly probable that mechanical properties such as strength and elongation are not maintained.

Incidentally, in the present invention, as for the aromatic polycarbonate resin (B), one resin may be used alone, or two or more resins may be mixed and used.

<Polycarbonate Resin Composition (X)>

The polycarbonate resin composition (X) of the present invention is a polycarbonate resin composition (X) comprising (A) a polycarbonate resin containing (a) a structural unit derived from a dihydroxy compound having a moiety represented by the following formula (1) in a part of the structure and (B) an aromatic polycarbonate resin, and is preferably composed of (A) a polycarbonate resin and (B) an aromatic polycarbonate resin.

[Chem. 9]

$$+CH_2-O+ \quad (1)$$

(provided that a case where the moiety represented by formula (1) is a part of —CH$_2$—O—H is excluded).

The proportion of the polycarbonate resin (B) in the polycarbonate resin composition (X) containing the polycarbonate resin (A) and the aromatic polycarbonate resin (B) is 30 wt % or more, preferably 35 wt % or more, more preferably 40 wt % or more, still more preferably 45 wt % or more. On the other hand, the proportion is preferably 80 wt % or less, more preferably 75 wt % or less, still more preferably 70 wt % or less.

If the proportion of the aromatic polycarbonate resin (B) is less than the lower limit above, reduction in the mechanical properties or reduction in the heat resistance may be disadvantageously caused. On the other hand, if the proportion of the aromatic polycarbonate resin (B) exceeds the upper limit above, this may have a problem of leading to reduction in the surface hardness.

The structure derived from the dihydroxy compound having a moiety represented by formula (1), particularly, the structure containing a cyclic ether, has high polarity and therefore, the polarity of the polycarbonate resin (A) is high as the whole polymer, whereas the polarity of the aromatic polycarbonate resin (B) is relatively low. Accordingly, the resin composition obtained by mixing the polycarbonate resin (A) and the aromatic polycarbonate resin (B) is reduced in the total light transmittance without achieving a thorough compatibilization. When these are completely compatibilized, respective characteristics of two resins are substantially counterbalanced, and uniform physical properties are obtained in many cases. However, when the resins are not completely compatibilized, high surface hardness characteristic of the polycarbonate resin (A) is likely to be maintained, and the surface hardness of the resin composition as well as the molded body thereof is kept high as compared with the case where they are completely compatibilized.

For these reasons, the polycarbonate resin composition (X) in the present invention preferably has a total light transmittance of 90% or less without achieving a thorough compatibilization so as to keep high the surface hardness of the polycarbonate resin composition and the molded article of the polycarbonate resin.

The polycarbonate resin (A) and the aromatic polycarbonate resin (B) in the polycarbonate resin composition (X) may be sufficient if they are different kinds of resins, and the polycarbonate resin (A) is preferably a resin having a ring structure, more preferably a resin containing isosorbide.

<Resin Other than Polycarbonate Resin>

In the polycarbonate resin composition of the present invention and the molded article obtained using the polycarbonate resin, a resin other than a polycarbonate resin or an additive other than a resin may be also blended.

Specific examples of the resin other than a polycarbonate resin, which is blended for the purpose of further improving/adjusting the moldability or other physical properties, include a resin such as polyester-based resin, polyether, polyamide, polyolefin and polymethyl methacrylate, and a rubbery modifier such as core-shell, graft, and linear random block copolymers.

As for the blending amount of the resin other than a polycarbonate resin, the resin is preferably blended in a ratio of 1 to 30 parts by weight, more preferably from 3 to 20 parts by weight, still more preferably from 5 to 10 parts by weight, per 100 parts by weight of the mixture of the polycarbonate resin (A) and the aromatic polycarbonate resin (B) which are used in the present invention.

<Heat Stabilizer>

In the polycarbonate resin composition of the present invention and the molded article of the polycarbonate resin, a heat stabilizer can be blended so as to prevent reduction in the molecular weight and worsening of the color hue during molding. Examples of the heat stabilizer include a phosphorous acid, a phosphoric acid, a phosphonous acid, a phosphonic acid, and an ester thereof. Specific examples thereof include triphenyl phosphite, tris(nonylphenyl)phosphite, tris(2,4-di-tert-butylphenyl)phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl)pentaerythritol diphosphite, distearyl pentaerythritol diphosphite, tributyl phosphate, triethyl phosphate, trimethyl phosphate, triphenyl phosphate, diphenyl monoorthoxenyl phosphate, dibutyl phosphate, dioctyl phosphate, diisopropyl phosphate, tetrakis(2,4-di-tert-butylphenyl) 4,4'-biphenylenediphosphinate, dimethyl benzenephosphonate, diethyl benzenephosphonate, and dipropyl benzenephosphonate. Among these, trisnonylphenyl phosphite, trimethyl phosphate, tris(2,4-di-tert-butylphenyl)phosphite, bis(2,4-di-tert-butylphenyl)pentaerythritol diphosphite, bis(2,6-di-tert-butyl-4-methylphenyl)pentaerythritol diphosphite, and dimethyl benzenephosphonate are preferably used.

One of these heat stabilizers may be used alone, or two or more thereof may be used in combination. As for the blending amount of the heat stabilizer, the heat stabilizer is preferably blended in a ratio of 0.0001 to 1 part by weight, more preferably from 0.0005 to 0.5 parts by weight, still more preferably from 0.001 to 0.2 parts by weight, per 100 parts by weight of the mixture of the polycarbonate resin (A) and the aromatic polycarbonate resin (B) which are used in the present invention. By blending the heat stabilizer within such a range, the resin can be prevented from reduction in the molecular weight or discoloration without causing bleeding or the like of the additive.

<Antioxidant>

Furthermore, in the polycarbonate resin composition of the present invention and the molded article of the polycarbonate resin, a conventionally known antioxidant can be blended for the purpose of preventing oxidation. Examples of the antioxidant include one member or two or more members selected from pentaerythritol tetrakis(3-mercaptopropionate), pentaerythritol tetrakis(3-laurylthiopropionate), glycerol 3-stearylthiopropionate, triethylene glycol bis[3-(3-tert-butyl-5-methyl-4-hydroxyphenyl)propionate], 1,6-hexanediol bis[3-(3,5-di-tert-butyl-4-hydroxyphenyl)propionate], pentaerythritol tetrakis[3-(3,5-di-tert-butyl-4-hydroxyphenyl)propionate], octadecyl 3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocinnamamide), diethyl 3,5-di-tert-butyl-4-hydroxybenzylphosphonate, tris(3,5-di-tert-butyl-4-hydroxybenzyl)isocyanurate, tetrakis(2,4-di-tert-butylphenyl) 4,4'-biphenylenediphosphinate, and 3,9-bis{1,1-dimethyl-2-[β-(3-tert-butyl-4-hydroxy-5-methylphenyl)propionyloxy]ethyl}-2,4,8,10-tetraoxaspiro(5,5)undecane.

As for the blending amount of the antioxidant, the antioxidant is preferably blended in a ratio of 0.0001 to 1 part by weight, more preferably from 0.0005 to 0.5 parts by weight, still more preferably from 0.001 to 0.2 parts by weight, per 100 parts by weight of the mixture of the polycarbonate resin (A) and the aromatic polycarbonate resin (B) which are used in the present invention. By blending the antioxidant within such a range, the resin can be prevented from oxidative deterioration without causing bleeding of the antioxidant to the surface of the molded body or reduction in the mechanical properties of various molded articles.

<Ultraviolet Absorber>

An ultraviolet absorber may be blended for the purpose of further improving the weather resistance of the polycarbonate resin composition of the present invention and the molded article of the polycarbonate resin. Examples of the ultraviolet absorber include 2-(2'-hydroxy-5'-tert-octylphenyl)benzotriazole, 2-(3-tert-butyl-5-methyl-2-hydroxyphenyl)-5-chlorobenzotriazole, 2-(5-methyl-2-hydroxyphenyl)benzotriazole, 2-[2-hydroxy-3,5-bis(α,α-dimethylbenzyl)phenyl]-2H-benzotriazole, 2,2'-methylenebis(4-cumyl-6-benzotriazolephenyl), and 2,2'-p-phenylenebis(1,3-benzoxazin-4-one).

An ultraviolet absorber having a melting point of 120 to 250° C. is preferred. When an ultraviolet absorber having a melting point of 120° C. or more is used, the molded article is improved in terms of surface fogging due to a gas. Specifically, a benzotriazole-based ultraviolet absorber such as 2-(2'-hydroxy-5'-methylphenyl)benzotriazole, 2-(2'-hydroxy-3'-tert-butyl-5'-methylphenyl)-5-chlorobenzotriazole, 2-[2'-hydroxy-3'-(3",4",5",6"-tetrahydrophthalimidomethyl)-5'-methylphenyl]benzotriazole, 2,2-methylenebis[4-(1,1,3,3-tetramethylbutyl)-6-(2H-benzotriazol-2-yl)phenol and 2-(2-hydroxy-3,5-dicumylphenyl)benzotriazole is used, and among these, 2-(2-hydroxy-3,5-dicumylphenyl)benzotriazole and 2,2-methylenebis[4-(1,1,3,3-tetramethylbutyl)-6-(2H-benzotriazol-2-yl)phenol are preferred. One of these ultraviolet absorbers may be used alone, or two or more thereof may be used in combination.

As for the blending amount of the ultraviolet absorber, the ultraviolet absorber is preferably blended in a ratio of 0.0001 to 1 part by weight, more preferably from 0.0005 to 0.5 parts by weight, still more preferably from 0.001 to 0.2 parts by weight, per 100 parts by weight of the mixture of the polycarbonate resin (A) and the aromatic polycarbonate resin (B) which are used in the present invention. By blending the ultraviolet absorber within such a range, the weather resistance of the resin composition and the molded article can be improved without causing bleeding of the ultraviolet absorber to the surface of the molded article or reduction in the mechanical properties of various molded articles.

<Hindered Amine-Based Light Stabilizer>

Also, a hindered amine-based light stabilizer can be blended for the purpose of further improving the weather resistance of the polycarbonate resin composition of the present invention and the molded article of the polycarbonate resin. Examples of the hindered amine-based light stabilizer include bis(2,2,6,6-tetramethyl-4-piperidyl)sebacate, bis(1,2,2,6,6-pentamethyl-4-piperidyl)sebacate, poly[[6-(1,1,3,3-tetramethylbutyl)amino-1,3,5-triazine-2,4-diyl][(2,2,6,6-tetramethyl-4-piperidyl)imino]hexamethylene[(2,2,6,6-tetramethyl-4-piperidyl)imino]], an N,N'-bis(3-aminopropyl)ethylenediamine-2,4-bis[N-butyl-N-(1,2,2,6,6-pentamethyl-4-piperidylamino)-6-chloro-1,3,5-triazine condensate, and a polycondensate of dibutylamine, 1,3,5-triazine or N,N'-bis(2,2,6,6)-tetramethyl-4-piperidyl-1,6-hexamethylenediamine with N-(2,2,6,6-tetramethyl-4-piperidyl)butylamine. Among these, bis(2,2,6,6-tetramethyl-4-piperidyl)sebacate and bis(1,2,2,6,6-pentamethyl-4-piperidyl)sebacate are preferred.

As for the blending amount of the hindered amine-based light stabilizer, the hindered amine-based light stabilizer is preferably blended in a ratio of 0.001 to 1 part by weight, more preferably from 0.005 to 0.5 parts by weight, still more preferably from 0.01 to 0.2 parts by weight, per 100 parts by weight of the mixture of the polycarbonate resin (A) and the aromatic polycarbonate resin (B) which are used in the present invention. By blending the hindered amine-based light stabilizer within such a range, the weather resistance of the molded article obtained by molding the polycarbonate resin composition of the present invention can be enhanced without causing bleeding of the hindered amine-based light stabilizer to the surface of the polycarbonate resin composition or reduction in the mechanical properties of various molded articles.

<Release Agent>

The polycarbonate resin composition of the present invention preferably further contains a release agent so as to more improve the releasability from a mold at the melt molding. Examples of the release agent include a higher fatty acid, a higher fatty acid ester of a monohydric or polyhydric alcohol, a natural animal wax such as beeswax, a natural plant wax such as carnauba wax, a natural petroleum wax such as paraffin wax, a natural coal wax such as montan wax, an olefin-based wax, a silicone oil, and an organopolysiloxane. Among these, a higher fatty acid and a higher fatty acid ester of a monohydric or polyhydric alcohol are preferred.

The higher fatty acid ester is preferably a partial or complete ester of a substituted or unsubstituted, monohydric or polyhydric alcohol having a carbon number of 1 to 20 with a substituted or unsubstituted, saturated fatty acid having a carbon number of 10 to 30. Examples of the partial or complete ester of a monohydric or polyhydric alcohol with a saturated fatty acid include stearic acid monoglyceride, stearic acid diglyceride, stearic acid triglyceride, stearic acid monosorbitate, stearyl stearate, behenic acid monoglyceride, behenyl behenate, pentaerythritol monostearate, pentaerythritol tetrastearate, pentaerythritol tetrapelargonate, propylene glycol monostearate, stearyl stearate, palmityl palmitate, butyl stearate, methyl laurate, isopropyl palmitate, biphenyl biphenate, sorbitan monostearate, and 2-ethylhexyl stearate. Among these, stearic acid monoglyceride, stearic acid triglyceride, pentaerythritol tetrastearate and behenyl behenate are preferably used.

The higher fatty acid is preferably a substituted or unsubstituted, saturated fatty acid having a carbon number of 10 to 30. Examples of such a saturated fatty acid include myristic acid, lauric acid, palmitic acid, stearic acid, and behenic acid. One of these release agents may be used alone, or two or more thereof may be mixed and used.

The content of the release agent, per 100 parts by weight of the mixture of the polycarbonate resin (A) and the aromatic polycarbonate resin (B) which are used in the present invention, is preferably 0.0001 parts by weight or more, more preferably 0.01 parts by weight or more, still more preferably 0.1 parts by weight or more, and is preferably 2 parts by weight or less, more preferably 1 part by weight or less, still more preferably 0.5 parts by weight or less. If the content is too smaller than this range, a release failure may occur, whereas if the content is too larger than the range above, reduction in the heat resistance of the molded body may be caused.

In this embodiment, the addition timing and addition method for the release agent blended in the polycarbonate resin composition are not particularly limited. Examples of the addition timing include: in the case of producing the polycarbonate resin by a transesterification method, at the time when the polymerization reaction is completed; irrespective of the polymerization method, at the time when the polycarbonate resin is melted, such as during kneading of the polycarbonate resin and other ingredients blended; and at the time of blending/kneading with the polycarbonate resin in the solid state such as pellet or powder by means of an extruder or the like. As the addition method, a method of directly mixing or kneading the release agent with the polycarbonate resin may be used, or the release agent may be also added as a high-concentration masterbatch produced using a small amount of the polycarbonate resin, another resin or the like.

<Molding>

In this embodiment, a molded article of a polycarbonate resin, which is produced by molding the above-described polycarbonate resin composition, is obtained. The molding method for the molded article of the polycarbonate resin is not particularly limited but includes a method where raw materials such as polycarbonate resin (A), aromatic polycarbonate resin (B) and if desired, other resins or additives are directly mixed, charged into an extruder or an injection molding machine, and molded; and a method where those raw materials are melt-mixed using a twin-screw extruder and extruded into a strand form to produce a pellet and the pellet is charged into an extruder or an injection molding machine and molded. Also, the molded article of the polycarbonate resin of the invention is excellent in the light resistance and transparency and therefore, can be used as a noise insulation wall for roads, an arcade ceiling sheet, an arcade ceiling plate, a roofing material for facilities, a wall material for facilities, and the like.

<Pencil Hardness>

The pencil hardness of the polycarbonate resin composition of the present invention can be measured using a 3 mm-thick test piece composed of the polycarbonate resin composition, in accordance with JIS-K5600 (1999) under the conditions of a load of 750 g, a measuring speed of 30 mm/min and a measuring distance of 7 mm. The pencil hardness of the polycarbonate resin composition of the present invention as measured by this method is preferably a hardness of B or more, more preferably a hardness of HB or more. If the pencil hardness is a hardness less than B, there may arise a problem that the obtained molded article is readily scratched and the appearance is likely to be impaired. Incidentally, the pencil hardness decreases in the order of 4H, 3H, 2H, H, F, HB, B, 2B, 3B and 4B, where 4B indicates a lowest surface hardness.

<Total Light Transmittance>

The total light transmittance of the polycarbonate resin composition of the present invention is measured using a test piece composed of the polycarbonate resin composition in accordance with JIS K7105 (1981) with a D65 light source. Since the resin composition of the present invention is technically characterized in that compatibility of polycarbonate resins contained is not high, the total light transmittance of the polycarbonate resin composition of the present invention as measured by the method may be low, and an opaque white molded body may result. Therefore, the resin composition is preferably used for an application requiring opacity, such as privacy glass (opaque glass), or an application where the composition is utilized by mixing a coloring agent such as various dyes or pigments with it. The upper limit of the total light transmittance is preferably 90%, more preferably 85% or less, still more preferably 80% or less, yet still more preferably 75% or less.

EXAMPLES

The present invention is described in greater detail below by referring to Examples, but the present invention is not limited to these Examples as long as the purport thereof is observed.

Physical properties and characteristics of the polycarbonate resin, polycarbonate resin composition, molded article and the like were evaluated by the following methods.

[Evaluation of Physical Properties/Characteristics]

(1) Measurement of Reduced Viscosity

A polycarbonate solution having a concentration of 0.6 g/dL was prepared by dissolving a polycarbonate resin sample in methylene chloride used as a solvent and measured at a temperature of 20.0° C.±0.1° C. by using an Ubbelohde viscosity tube manufactured by Moritomo Rika Kogyo, and the relative viscosity $\eta_{rel}$ was determined from the flow-through time $t_0$ of the solvent and the flow-through time t of the solution according to the following formula:

$$\eta_{rel} = t/t_0$$

The specific viscosity $\eta_{sp}$ was determined from the relative viscosity according to the following formula:

$$\eta_{sp} = (\eta - \eta_0)/\eta_0 = \eta_{rel} - 1$$

The reduced viscosity $\eta_{sp}/c$ was determined by dividing the specific viscosity by the concentration c (g/dL). A higher value indicates a larger molecular weight.

(2) Surface Pencil Hardness

The measurement was performed under the following conditions in accordance with JIS-K5600 (1999) by using, as a measuring apparatus, a pencil-scratch coating film hardness tester manufactured by Toyo Seiki Ltd.

Load: 750 g
Measuring speed: 30 mm/min
Measuring distance: 7 mm

As pencils, UNI (hardness: 4H, 3H, 2H, H, F, HB, B, 2B, 3B and 4B) manufactured by Mitsubishi Pencil Co., Ltd. was used.

The measurement was performed five times, and the hardness lower by one grade than the pencil hardness at which a scratch was generated two or more times, was taken as the pencil hardness of the substance measured.

(3) Measurement of Total Light Transmittance

The total light transmittance of an injection-molded piece was measured in accordance with JIS K7105 (1981) with a D65 light source by using a hazemeter (NDH2000, manufactured by Nippon Denshoku Kogyo K.K.).

[Raw Material]

<Polycarbonate Resin (A)>

Abbreviations of compounds used in Examples are as follows.

ISB: Isosorbide (trade name: POLYSORB, produced by Roquette Freres)

CHDM: 1,4-Cyclohexanedimethanol (SKY CHDM, produced by New Japan Chemical Co., Ltd.)

BPC: 2,2-Bis(4-hydroxy-3-methylphenyl)propane (produced by Honshu Chemical Industry Co., Ltd.)

DPC: Diphenyl carbonate (produced by Mitsubishi Chemical Corp.)

<Production Method of PC1>

Into a polymerization reaction apparatus equipped with a stirring blade and a reflux condenser controlled to 100° C., ISB, CHDM, DPC purified by distillation to a chloride ion concentration of 10 ppb or less, and calcium acetate monohydrate were charged to have a molar ratio of ISB/CHDM/

DPC/calcium acetate monohydrate=0.70/0.30/1.00/6.5×10$^{-7}$, and thoroughly purged with nitrogen.

Subsequently, the system was heated by a heating medium and at the point when the internal temperature reached 100° C., stirring was started to melt and homogenize the contents under control to keep the internal temperature at 100° C. Thereafter, temperature rise was started and by raising the internal temperature to 210° C. in 40 minutes, at the point when the internal temperature reached 210° C., the system was controlled to keep this temperature. At the same time, pressure reduction was started, and the pressure reached 13.3 kPa (absolute pressure, hereinafter the same) in 90 minutes after reaching 210° C. While keeping this pressure, the system was further held for 30 minutes.

Phenol vapor generated as a by-product along with the progress of polymerization reaction was introduced into a reflux condenser using, as a cooling medium, steam controlled to 100° C. in terms of the temperature at the inlet to the reflux condenser, monomer ingredients contained in a slight amount in the phenol vapor were returned to the polymerization reactor, and uncondensed phenol vapor was subsequently introduced into a condenser using, as a cooling medium, warm water at 45° C. and recovered.

After the pressure was once returned to atmospheric pressure, the thus-oligomerized contents were transferred to another polymerization reaction apparatus equipped with a stirring blade and a reflux condenser controlled in the same manner as above, and temperature rise and pressure reduction were started, as a result, the internal temperature and the pressure reached 210° C. and 200 Pa, respectively, in 60 minutes. Thereafter, the internal temperature and the pressure were adjusted to 230° C. and 133 Pa or less, respectively, over 20 minutes, and at the point when a predetermined stirring power was achieved, the pressure was recovered. A polycarbonate resin in the molten state discharged from the outlet of the polymerization reaction apparatus was pelletized by pelletizer to obtain a pellet. The reduced viscosity was 0.44 dl/g.

<Production Method of PC2>

This resin was produced in the same manner as PC1 except for charging the raw materials to have a molar ratio of ISB/CHDM/DPC/calcium acetate monohydrate=0.50/0.50/1.00/6.5×10$^{-7}$.

The reduced viscosity was 0.61 dl/g.

<Production Method of PC3>

This resin was produced in the same manner as PC1 except for charging the raw materials to have a molar ratio of ISB/CHDM/DPC/calcium acetate monohydrate 0.80/0.20/1.00/6.5×10$^{-7}$.

The reduced viscosity was 0.37 dl/g.

<Production Method of PC4>

This resin was produced in the same manner as PC1 except for charging the raw materials to have a molar ratio of ISB/CHDM/DPC/calcium acetate monohydrate=0.40/0.60/1.00/6.5×10$^{-7}$.

The reduced viscosity was 0.63 dl/g.

<Aromatic Polycarbonate Resin (B)>
<Aromatic Polycarbonate Resin (PC5)>

PC5: Novarex 7022J produced by Mitsubishi Engineering-Plastics Corp. (an aromatic polycarbonate resin containing only a structure derived from 2,2-bis-(4-hydroxyphenyl)propane; the reduced viscosity was 0.51 dl/g)

<Production Method of Aromatic Polycarbonate Resin (PC6)>

Into a polymerization reaction apparatus equipped with a stirring blade and a reflux condenser controlled to 100° C., BPC, DPC purified by distillation to a chloride ion concentration of 10 ppb or less, and calcium acetate monohydrate were charged to have a molar ratio of BPC/DPC/calcium acetate monohydrate=1.00/1.03/1.5×10$^{-6}$, and thoroughly purged with nitrogen.

Subsequently, the system was heated by a heating medium and at the point when the internal temperature reached 100° C., stirring was started to melt and homogenize the contents under control to keep the internal temperature at 100° C. Thereafter, temperature rise was started and by raising the internal temperature to 230° C. in 40 minutes, at the point when the internal temperature reached 230° C., the system was controlled to keep this temperature. At the same time, pressure reduction was started, and the pressure reached 13.3 kPa (absolute pressure, hereinafter the same) in 40 minutes after reaching 230° C. While keeping this pressure, the system was further held for 80 minutes.

Phenol vapor generated as a by-product along with the progress of polymerization reaction was introduced into a reflux condenser using, as a cooling medium, steam controlled to 100° C. in terms of the temperature at the inlet to the reflux condenser, monomer ingredients contained in a slight amount in the phenol vapor were returned to the polymerization reactor, and uncondensed phenol vapor was subsequently introduced into a condenser using, as a cooling medium, warm water at 45° C. and recovered.

After the pressure was once returned to atmospheric pressure, the thus-oligomerized contents were transferred to another polymerization reaction apparatus equipped with a stirring blade and a reflux condenser controlled in the same manner as above, and temperature rise and pressure reduction were started, as a result, the internal temperature and the pressure reached 240° C. and 13.3 kPa, respectively, in 40 minutes. Thereafter, temperature rise was continued and by reducing the pressure to 339 Pa over 40 minutes, distilled phenol was removed out of the system. Temperature rise and pressure reduction were further continued and after the pressure reached 70 Pa, the polycondensation reaction was performed while keeping the pressure at 70 Pa. The final internal temperature was 285° C. At the point when a predetermined stirring power was achieved, the pressure was recovered, and a polycarbonate resin in the molten state discharged from the outlet of the polymerization reaction apparatus was pelletized by pelletizer to obtain a pellet. The reduced viscosity of the obtained aromatic polycarbonate resin (PC6) was 0.52 dl/g.

Example 1

After dry blending PC1 and PC5 in a weight ratio of 60:40, the blend was extruded at a resin temperature of 250° C. by using a twin-screw extruder (TEX30HSS-32) manufactured by The Japan Steel Works, Ltd. The extrudate was solidified by cooling with water and then pelletized with a rotary cutter. The pellet was dried at 80° C. for 10 hours in a nitrogen atmosphere and then fed to an injection molding machine (Model J75EII, manufactured by The Japan Steel Works, Ltd.) to mold an injection-molded plate (60 mm (width)×60 mm (length)×3 mm (thickness)) under the conditions of a resin temperature of 250° C., a mold temperature of 60° C. and a molding cycle of 40 seconds.

The sample obtained was measured for the surface pencil hardness and total light transmittance, and the results are shown in Table 1.

Example 2

Production and evaluation of the sample were performed in the same manner as in Example 1 except for mixing PC1 and PC5 in a weight ratio of 40:60. The results are shown in Table 1.

Example 3

Production and evaluation of the sample were performed in the same manner as in Example 1 except for mixing PC2 and PC6 in a weight ratio of 60:40. The results are shown in Table 1.

Example 4

Production and evaluation of the sample were performed in the same manner as in Example 1 except for mixing PC2 and PC6 in a weight ratio of 40:60. The results are shown in Table 1.

Example 5

Production and evaluation of the sample were performed in the same manner as in Example 1 except for mixing PC3 and PC6 in a weight ratio of 25:75. The results are shown in Table 1.

Comparative Example 1

Production and evaluation of the sample were performed in the same manner as in Example 1 except for mixing PC4 and PC5 in a weight ratio of 90:10. The results are shown in Table 1.

Comparative Example 2

Production and evaluation of the sample were performed in the same manner as in Example 1 except for mixing PC4 and PC5 in a weight ratio of 80:20. The results are shown in Table 1.

Comparative Example 3

Production and evaluation of the sample were performed in the same manner as in Example 1 except for mixing PC4 and PC5 in a weight ratio of 60:40. The results are shown in Table 1.

TABLE 1

|  |  |  | Example |  |  |  |  | Comparative Example |  |  |
|---|---|---|---|---|---|---|---|---|---|---|
|  |  |  | 1 | 2 | 3 | 4 | 5 | 1 | 2 | 3 |
| Polycarbonate resin (parts by weight) | (A) | PC1 | 60 | 40 |  |  |  |  |  |  |
|  |  | PC2 |  |  | 60 | 40 |  |  |  |  |
|  |  | PC3 |  |  |  |  | 25 |  |  |  |
|  |  | PC4 |  |  |  |  |  | 90 | 80 | 60 |
|  | (B) | PC5 | 40 | 60 |  |  |  | 10 | 20 | 40 |
|  |  | PC6 |  |  | 40 | 60 | 75 |  |  |  |
| Evaluation | Pencil hardness |  | F | F | H | 2H | 2H | B | B | B |
|  | Total light transmittance (%) |  | 7.3 | 6.1 | 15.4 | 10.1 | 7.1 | 90.1 | 90.1 | 90.2 |

In the Table, the empty box means no use of the resin (that is, zero).

As seen from the Table above, it was revealed that when an uncompatibilized state is kept and the total light transmittance is 90% or less, the surface pencil hardness is higher than that of the polycarbonate resin composition in the compatibilized state and a molded body insusceptible to scratching is obtained.

While the invention has been described in detail and with reference to specific embodiments thereof, it will be apparent to one skilled in the art that various changes and modifications can be made therein without departing from the spirit and scope of the invention. This application is based on Japanese Patent Application (Patent Application No. 2011-031777) filed on Feb. 17, 2011, and Japanese Patent Application (Patent Application No. 2011-031789) filed on Feb. 17, 2011, the contents of which are incorporated herein by way of reference.

INDUSTRIAL APPLICABILITY

The polycarbonate resin composition of the present invention has excellent surface hardness and can be suitably used in the building material field, the electric/electronic field, the automotive field, the optical component field, and the like.

The invention claimed is:

1. A polycarbonate resin composition (X), comprising:
    (A) a polycarbonate resin containing (a) a structural unit derived from a dihydroxy compound having a moiety represented by the following formula (1) in a part of a structure; and
    (B) an aromatic polycarbonate resin,
    wherein a reduced viscosity of the aromatic polycarbonate resin (B) is 0.55 dl/g or less,
    a proportion of the aromatic polycarbonate resin (B) in the polycarbonate resin composition (X) is 30 wt % or more, and
    a total light transmittance of the polycarbonate resin composition (X) is 90% or less:

provided that a case where the moiety represented by formula (1) is a part of —$CH_2$—O—H is excluded.

2. The polycarbonate resin composition according to claim 1,
    wherein the dihydroxy compound having a moiety represented by formula (1) in a part of a structure is a dihydroxy compound having a plurality of moieties represented by formula (1).

3. The polycarbonate resin composition according to claim 1,
    wherein the dihydroxy compound having a moiety represented by formula (1) in a part of a structure is a dihydroxy compound having a cyclic structure.

4. The polycarbonate resin composition according to claim 1,
wherein the dihydroxy compound having a moiety represented by formula (1) in a part of a structure is a dihydroxy compound represented by the following formula (2):

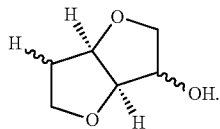
(2)

5. The polycarbonate resin composition according to claim 4,
wherein the polycarbonate resin (A) contains a structural unit derived from the dihydroxy compound represented by formula (2) in an amount of 20 mol % to less than 90 mol %.

6. The polycarbonate resin composition according to claim 1,
wherein the polycarbonate resin (A) contains at least either one of a structural unit derived from a dihydroxy compound of an aliphatic hydrocarbon and a structural unit derived from a dihydroxy compound of an alicyclic hydrocarbon in an amount of 10 mol % to less than 80 mol %.

7. The polycarbonate resin composition according to claim 1,
wherein the aromatic polycarbonate resin (B) contains a structural unit represented by the following formula (7) in an amount of more than 70 mol % based on all structural units derived from dihydroxy compounds:

$$—[—O—Ar^1—X—Ar^2—]—OC(=O)— \qquad (7)$$

wherein in formula (7), each of $Ar^1$ and $Ar^2$ independently represents an arylene group which may have a substituent; and X represents a single bond or a divalent group.

8. A polycarbonate resin molded article, which is obtained by molding the polycarbonate resin composition according to claim 1.

* * * * *